(12) United States Patent
Rakshit (10) Patent No.: US 9,733,881 B2
(45) Date of Patent: Aug. 15, 2017

(54) MANAGING DIGITAL OBJECT VIEWABILITY FOR A TRANSPARENT DISPLAY SYSTEM

(71) Applicant: INTERNATIONAL BUSINESS MACHINES CORPORATION, Armonk, NY (US)

(72) Inventor: Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 154 days.

(21) Appl. No.: 14/839,045

(22) Filed: Aug. 28, 2015

(65) Prior Publication Data

US 2017/0060512 A1 Mar. 2, 2017

(51) Int. Cl.
*G06F 3/14* (2006.01)
*G09G 5/14* (2006.01)
(Continued)

(52) U.S. Cl.
CPC .............. *G06F 3/1423* (2013.01); *G09G 5/14* (2013.01); *G09G 5/363* (2013.01); *G09G 5/377* (2013.01);
(Continued)

(58) Field of Classification Search
CPC ..... G06T 19/006; G06T 17/00; G06T 3/0062; G06T 7/344; G06T 7/70; G06F 17/30241; G06F 3/011; G06F 3/017; G09G 2300/023; G09G 3/003; G09G 3/3208; H01L 27/3267; H04N 1/387
See application file for complete search history.

(56) References Cited

U.S. PATENT DOCUMENTS 6,166,744 A * 12/2000 Jaszlics ................... G06T 17/00
345/421
8,279,510 B2 10/2012 Kuhlman et al.
(Continued)

OTHER PUBLICATIONS

Li, Jiannan, et al. "Interactive two-sided transparent displays: designing for collaboration." Proceedings of the 2014 conference on Designing interactive systems. ACM, 2014.*
(Continued)

*Primary Examiner* — Sultana M Zalalee
(74) *Attorney, Agent, or Firm* — Ronald A. Kaschak; Matthew M. Hulihan; Heslin Rothenberg Farley & Mesiti PC (57) ABSTRACT

An example facility described herein includes identifying an object displayed on a first display at a first side of a multi-display system, the multi-display system being at least partially transparent between the first display and a second display at a second side of the multi-display system; obtaining image(s) of a scene adjacent to the first side; determining a display area, of the second display, through which an impression of the object is viewable from the second side based on the multi-display system being at least partially transparent between the first and displays; and presenting, in the display area of the second display, at least a portion of the image(s) of the scene adjacent to the first side to at least partially mask the impression of the object and mimic transparency of the second display in the display area of the second display.

20 Claims, 7 Drawing Sheets

(51) Int. Cl.
*G09G 5/36* (2006.01)
*G09G 5/377* (2006.01)

(52) U.S. Cl.
CPC ..... *G09G 2320/10* (2013.01); *G09G 2354/00* (2013.01); *G09G 2358/00* (2013.01)

(56) References Cited

U.S. PATENT DOCUMENTS

| | | | |
|---|---|---|---|
| 8,493,364 B2 | 7/2013 | Charlier et al. | |
| 2009/0237738 A1* | 9/2009 | Yang | H04N 1/387 358/3.01 |
| 2010/0245387 A1* | 9/2010 | Bachelder | G06T 19/006 345/633 |
| 2011/0211040 A1* | 9/2011 | Lindemann | G01C 11/02 348/36 |
| 2011/0242090 A1* | 10/2011 | Keating | G06T 19/006 345/419 |
| 2012/0313839 A1* | 12/2012 | Smithwick | G02B 27/2214 345/6 |
| 2014/0139458 A1* | 5/2014 | Premutico | G09G 3/3208 345/173 |
| 2015/0363966 A1* | 12/2015 | Wells | G06F 3/017 345/419 |

OTHER PUBLICATIONS

David Lindlbauer et al., "Tracs: Transparency Control for See-Through Displays", UIST'14, Oct. 5-8, 2014, Honolulu, HI, pp. 657-661.

Sebastian Anthony, "Jaguar Concept Car Has Transparent Pillars, Windshield HUD With Mario Kart-Like 'Ghost' Mode", Dec. 15, 2014, 4 pages, http://www.extremetech.com/extreme/195951-jaguar-concept-car-has-transparent-pillars-advanced-hud-with-mario-kart-like-ghost-mode.

* cited by examiner

MANAGING DIGITAL OBJECT VIEWABILITY FOR A TRANSPARENT DISPLAY SYSTEM

BACKGROUND

Interactions between individuals sometimes take place between a glass panel provided for security or other purposes. Banks, airports, ticket counters, and visa/passport offices are example venues in which a customer/user might interact with an employee, teller, support expert, or the like ("service provider" or "representative" herein) across a transparent panel to effect a transaction. The representative often times uses a computer system to support the representative's activities in assisting the customer, but this can be distracting for the representative and the customer. As an example, the representative's attention is often times directed away from the customer and toward a display of the computer system that is hidden from the customer. Furthermore, current systems fail to adequately provide enhanced, secure facilities for enabling customer-representative interaction across the physical interface separating them.

SUMMARY

Shortcomings of the prior art are overcome and additional advantages are provided through the provision of a method that includes identifying an object displayed on a first display at a first side of a multi-display system, the multi-display system being at least partially transparent between the first display and a second display at a second side of the multi-display system; obtaining one or more images of a scene adjacent to the first side of the multi-display system; determining a display area, of the second display, through which an impression of the object is viewable from the second side of the multi-display system based on the multi-display system being at least partially transparent between the first display and the second display; and presenting, in the display area of the second display, at least a portion of the one or more images of the scene adjacent to the first side of the multi-display system to at least partially mask the impression of the object and mimic transparency of the second display in the display area of the second display.

Further, a computer system is provided that includes a memory and a processor in communications with the memory, wherein the computer system is configured to perform a method including: identifying an object displayed on a first display at a first side of a multi-display system, the multi-display system being at least partially transparent between the first display and a second display at a second side of the multi-display system; obtaining one or more images of a scene adjacent to the first side of the multi-display system; determining a display area, of the second display, through which an impression of the object is viewable from the second side of the multi-display system based on the multi-display system being at least partially transparent between the first display and the second display; and presenting, in the display area of the second display, at least a portion of the one or more images of the scene adjacent to the first side of the multi-display system to at least partially mask the impression of the object and mimic transparency of the second display in the display area of the second display.

Yet further, a computer program product including a computer readable storage medium readable by a processor and storing instructions for execution by the processor is provided for performing a method that includes: identifying an object displayed on a first display at a first side of a multi-display system, the multi-display system being at least partially transparent between the first display and a second display at a second side of the multi-display system; obtaining one or more images of a scene adjacent to the first side of the multi-display system; determining a display area, of the second display, through which an impression of the object is viewable from the second side of the multi-display system based on the multi-display system being at least partially transparent between the first display and the second display; and presenting, in the display area of the second display, at least a portion of the one or more images of the scene adjacent to the first side of the multi-display system to at least partially mask the impression of the object and mimic transparency of the second display in the display area of the second display.

Additional features and advantages are realized through the concepts described herein.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects described herein enhance the ability of individuals to securely interact using/through a physical interface including at least partially transparent displays. In an example in which interactions between individuals take place between a glass panel, computer system(s) supporting the activities of the individuals, e.g. a customer and a service provider/representative, are often independent of the glass panel. However, it may be desired that the interface (e.g.

glass panel or other interface) be made of at least partially transparent display/display device used with the computer system. The representative and/or customer may interact through the interface and interact with objects displays of the interface. The interface can serve multiple purposes including providing physical separation between the individuals while maintaining transparency for the individuals to view each other, and providing one or more display devices of one or more computing systems supporting the individuals' activities. Within this context, aspects described herein manage user's ability to view and/or interact with digital object on a transparent multi-display system.

Figure 1:
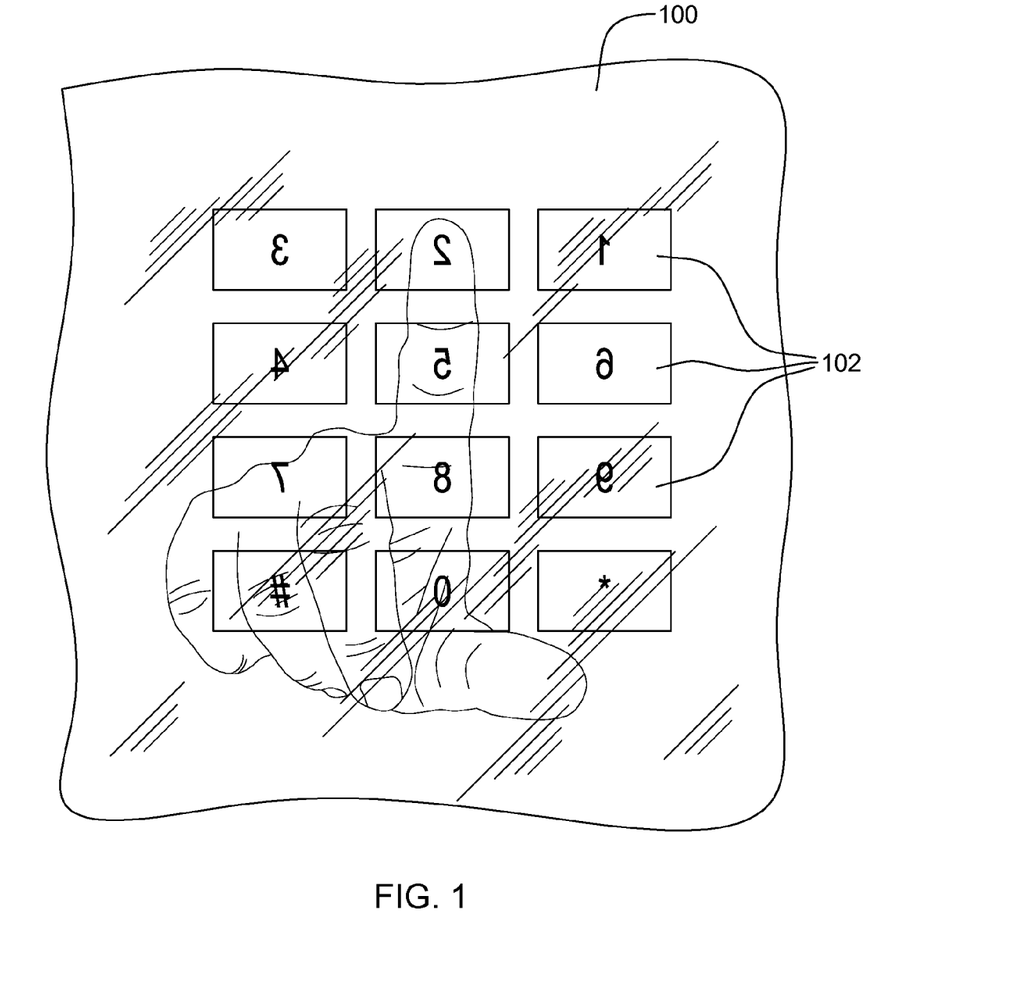
FIG. 1 depicts an example in which digital objects are displayed on a first side of a transparent display and impressions of these objects are viewable from a second side of the transparent display.

In the above-proposed scenario, a digital object displayed on a transparent display may be viewable from both sides of the display. More specifically, impressions that the digital objects, displayed on a first side, are viewable from the second side. The display of object on a first side of something refers to the display of the object on a display, display surface, display device, or similar component. Transparency herein includes full and/or partial transparency at one or more portions of the display. Transparency presents conveniences for objects that are intended to be viewed by the individuals on both sides of the display, but it also presents potential problems. For instance, an object being displayed may be privileged and not meant for view by an individual viewing the other side of the display. In this regard, when a digital object is presented on an active side/surface of the transparent display, an impression of the object may be viewable from another (e.g. opposite) side of the transparent display. FIG. 1 depicts an example in which digital objects are displayed on a first side of a transparent display 100 and impressions of these objects are viewable from a second side of the transparent display. In this example, a digital keypad is presented on the front/first side of the display, the digital keypad including several digital objects 102 representing alphanumeric buttons. The example of FIG. 1 views the transparent display 100 from the back/second side of the display, in which impressions of the digital objects 102 are viewable based on the transparent character of the display. The digital objects 102 being displayed are viewable to a user viewing the front side of the display, and impressions of those objects are viewable to a user viewing the backside of the display. Given this, the content of the object(s) being displayed and any user-activity being performed against those objects may be viewable by a person viewing the other side of the transparent display. This presents privacy and other security issues when the information being displayed and/or the activity being performed against the information is sensitive, for instance when a customer is presented a digital keypad on the display to enter his/her personal identification number or password, or when a representative views proprietary information that is not to be shared with the customer.

Described herein are facilities to mask impressions, viewable in areas on one side of a transparent display, of digital objects displayed at/on another side of the transparent display, while mimicking transparency in those areas. This is achieved, in part, by presenting portion(s) of image(s) in those areas, the portions of the images being images of what the user would see if those areas remained transparent and the digital objects were not actually present on the other side of the display. This provides an impression to a user at one side that he/she is 'looking through' the transparent display to the other side, even though digital objects presented on the other wise may be obstructing the user's view.

Figure 2:
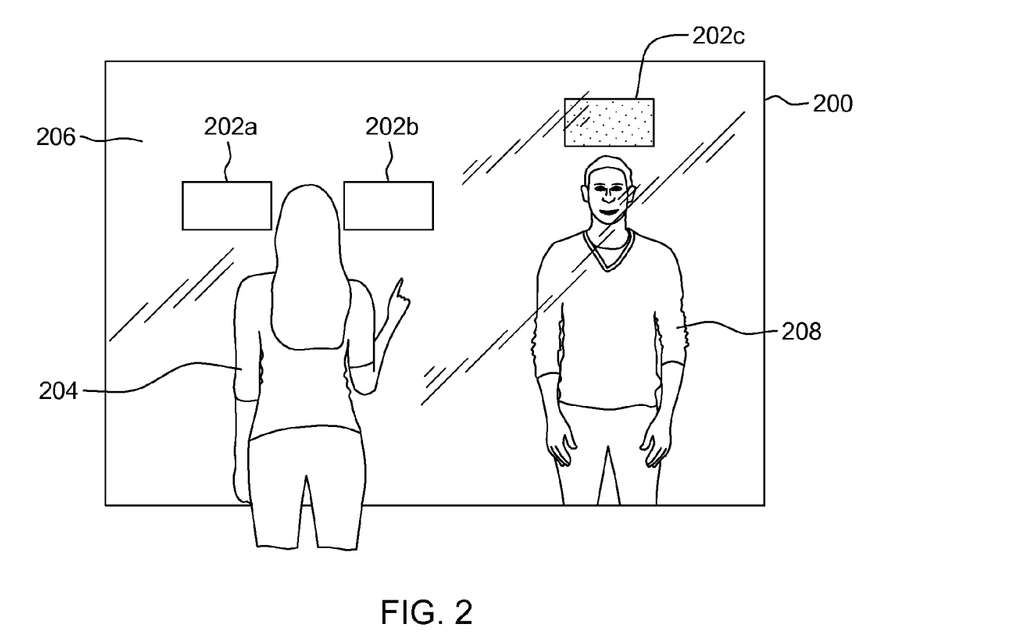
FIG. 2 depicts an example in which a first user at a first side of a transparent display interacts with digital objects presented on the first side of the transparent display, and a second user is at a second side of a transparent display.

By way of example with reference to a specific embodiment, a multi-display system includes two transparent touch-sensitive displays overlaid with each other (this may be built as one panel having two active, back-to-back display surfaces for instance) to create a multi-user controllable transparent display. In this context, FIG. 2 depicts an example in which a first user at a first side of a transparent display interacts with digital objects presented on the first side of the transparent display, and a second user is at a second side of a transparent display. The first user 204 navigates digital objects 202a, 202b, 202c on the first side 206 of the transparent display 200. The objects may be on a first display surface or display device (sometimes referred to herein as just "display"), for instance, of the transparent display 200. In this case, first user 204 views and also interacts with digital objects 202a, 202b, and 202c displayed on the first side 206. In accordance with aspects described herein, second user 208 viewing from the other side of the display 200 may be prevented from viewing the impression (s) of one or more of digital objects 202a, 202b, 202c, despite the transparent character of the display 200. Second user 208 viewing the display from the other side may instead see, in the areas in which impression(s) of digital objects 202a, 202, and/or 202c would otherwise be viewable, images that are image portions taken from images captured of a scene adjacent to the first side 206 of the display 200. As an example, images from a viewpoint looking outwardly from the first side 206 toward user 204 may be captured and used for presenting the image portions on the second side of the display. This is further described and illustrated with reference to FIG. 3.

Figure 3:
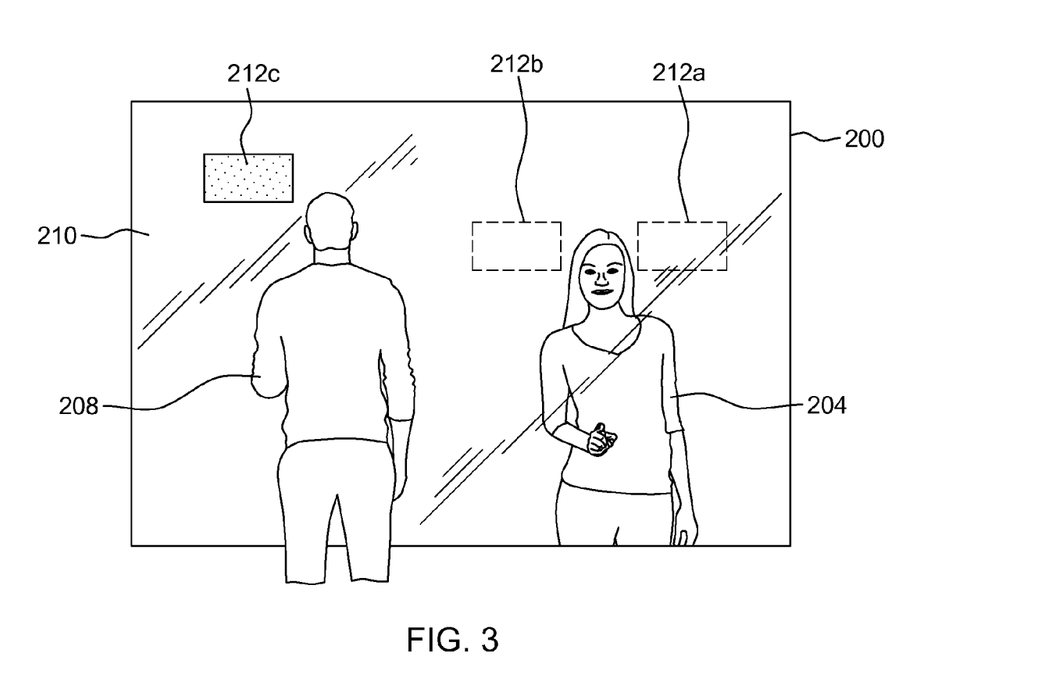
FIG. 3 depicts the example of FIG. 2 from a perspective of the second user at the second side of the transparent display, in which impressions of some of the digital objects presented on the first side of the transparent display are non-viewable to the second user, in accordance with aspects described herein.

FIG. 3 depicts the example of FIG. 2 from the perspective of the second user 208 at the second side of the transparent display. Impressions of some (e.g. 202a, 202b) of the digital objects presented on the first side 206 of the transparent display 200 are non-viewable to the second user 208, in accordance with aspects described herein. Here, second user 208 views second side 210 of display 200. In this example, second user 208 has privileges to view the impression of digital object 202c. As an example, object 202c is unprivileged, or privileges associated with the second user 208 satisfy privilege requirements to view object 202c. Thus, the impression of object 202c being displayed on the first side 206, the impression being in a region/area 212c of the second side 210 of display 200, is viewable to second user 208 in area 212c of the second side 210 of display 200. In contrast, second user 208 does not have privileges to view the impressions of digital objects 202b and 202c, the impressions being in regions/areas 212a and 212b respectively. As an example, objects 202a and 202b have associated therewith privileges or permissions that dictate that second user 208 is not allowed to view the impressions of objects 202a and 202b. Meanwhile, second user 208 is also (in this example) able to view first user 204 through the transparent display. This enables convenient interaction between the two users, while providing a secure and controllable interface for both to view digital objects.

Figure 4A:
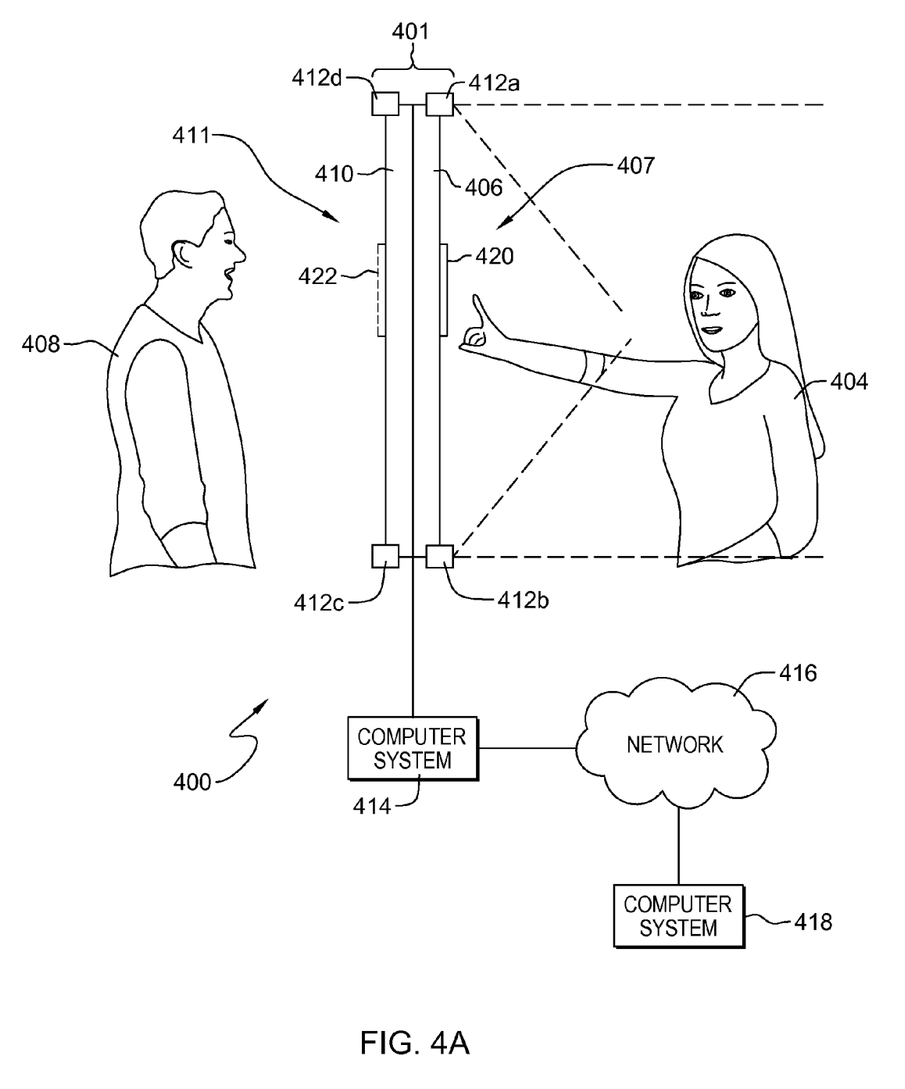
FIGS. 4A-4B depict an example environment including a multi-display system for masking, on a second at least partially transparent display, impressions of objects displayed on a first at least partially transparent display to mimic transparency of the second at least partially transparent display, in accordance with aspects described herein.
Figure 4B:
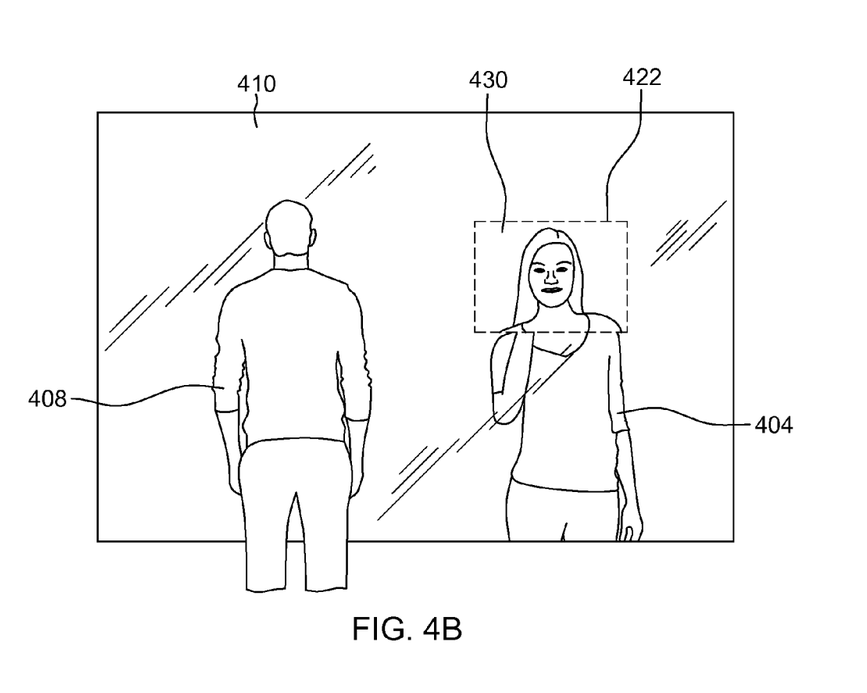

Accordingly, FIGS. 4A-4B depict an example environment including a multi-display system for masking, on a second at least partially transparent display, impressions of objects displayed on a first at least partially transparent display to mimic transparency of the second at least partially transparent display in accordance with aspects described herein. The environment 400 includes a multi-display system 401 having a first display 406 viewable from a first side 407 of the multi-display system and a second display 410 viewable from a second side 411 of the multi-display system. In this example, first display 406 and second display 410 are provided by separate display devices placed backto-back, but the multi-display system need not be implemented using two discrete display devices. Instead, as an example, the first and second displays could be part of one display device (i.e. 401) having multiple (e.g. two) active display surfaces, each being a display at/on which objects are displayed.

The multi-display system 401 is at least partially transparent between the first display 406 and second display 410, meaning that user 404 proximate the first side 407 is able to at least partially view through the multi-display system 401 to the second side 411, and user 408 proximate the second side 411 is able to at least partially view through the multi-display system 401 to the first side 407. The displays 406 and 410 of the multi-display system 401 may be made of transparent displays to provide the transparent characteristic to the multi-display system 401. Organic light-emitting diode (OLED), see-through LCD, and/or holographic technologies are example technologies that can provide transparent displays, though aspects described herein may apply to transparent displays provided by others types of transparent display technology. Based on the at least partial transparency of the system 401, impressions of objects presented on one display (e.g. first display 406) may be viewable from other sides of the display.

In addition, multiple cameras 412a, 412b, 412c and 412d are provided to capture images of scenes adjacent to the sides of the multi-display system. In FIG. 4A, camera 412a is affixed at the top of display 406 and camera 412b is affixed at the bottom of display 406, both facing outwardly away from the multi-display system. The field of view of camera 412a extends generally away and down from the system toward user 404, and the field of view of camera 412b extends generally away and up from the system toward user 404. Cameras 412c and 412d similarly capture images of the scene adjacent to the second side 411 of the system 401. Additionally or alternatively, the camera(s) provided with or as part of a multi-display system as described herein could include behind-the-screen camera(s) that are installed behind a display and facing outwardly, i.e. to capture images of a user or other scenes at the side of the multi-display system).

The system 401 is in communication with a computer system 414 that can perform processing to facilitate and/or perform aspects described herein. As an example, once a digital object 420 is plotted on first display 406, processing by software installed on computer system 414 (and/or a backend computer system 418 in communication with computer system 414 via one or more networks 416, an example of which may be the internet) can identify the positioning, such as coordinate positioning, of the digital object 420 presented on first display 406. Software can determine, based on that, an area 422 of second display 410 though which a digital impression of object 420 would be visible to user 408 based on the transparency of the system 401. In this example, area 422 is opposite the area of display 406 where the digital object 420 is presented. Using the images being captured of the scene adjacent to the first side 407 by one or more cameras (e.g. 412a and/or 412b here), processing can automatically and dynamically identify and/or build image (s) of the portion of the scene that is being obstructed from the second user's viewpoint by the impression of the digital object 420, and that would otherwise be viewable by second user 408 if the digital object 420 were not being displayed on first display 406. Thus, at least a portion of the captured images can be identified, extracted, and presented (perhaps in the form of a video) in area 422 of second display 410. This is illustrated in FIG. 4B, wherein image portions(430) are displayed (on display 410) in area 422. User 408 will see a digital object, and more specifically picture(s)/video, being presented on second display 410 in area 422, and the picture(s)/video will show approximately or exactly what the user 408 would see if he/she has an unobstructed view through system 401 to the other side. The display of the image portions in area 422 serves dual purposes of (i) at least partially masking the digital impression (of object 420 on display 406) that the user would otherwise see if nothing were presented on display 410 at area 422, due to the transparent nature of displays 410 and 406, while (ii) mimicking transparency of the display 410 and 406, and more generally system 401 as a whole, in area 422. The impression of object 420 will in this example be rendered anywhere from partially obscured to fully non-viewable by user 408 at the second side based on being masked by the image portion(s) taken from the image(s) captured by cameras 412a, 412b. It is noted that the rest of user 404 is visible to user 408 through the system based on the system's transparency and on the fact that there are no digital objects in user's line of sight through system 401 to user 404.

It is noted that the camera(s) at the first side may not detect objects, such as the hand of first user 404, that are too close to display 406. Consequently, the image portions presented at 422 may not show the user's hand/finger pressing against display 406 but instead may show an image of something deeper in the field of view toward first side 407 (in this example, a headshot of the user 404). Alternatively, if a behind-the-screen camera is disposed behind display 406, e.g. behind object 420, facing outwardly to user 404, then the images acquired by that camera would include images of the user's extended finger touching the display. Some behind-the-screen cameras have the ability to 'see through' the object(s) being presented on the display.

Any current or future developed techniques may be used to process the images/image data captured by cameras 412a and 412b in order to isolate the portion(s) to be presented on display 410. In some examples, the images of a scene as acquired by a collection of cameras adjacent a display may be stitched together to form a larger image. Processing can be performed to identify the portion of an image that the second user 408 on the opposite side 411 of the multi-display system would see of the scene (proximate the first side 407) from the second user's perspective. In some embodiments, that takes into account the second user's viewing angle looking toward display 410. The viewing angle may be detected using, for instance, facial-recognition and/or eye tracking facilities provided with or leveraged by the system 401 or associated computer system 414. Image portion(s) corresponding to the portions of the scene that user 408 on the opposite side 411 would see when looking through the multi-display system 401 are identified and then presented for the user 408 on the display 410 at/in area 422. In some examples, the second user's viewing angle is taken into account when determining the source of the captured images to be selected for further processing to determine image portions to present on the display 410 for user 408. The source may be the one with the angle of view toward the scene closest to the angle of the user's view. Thus, although the example of FIG. 4 includes only two cameras capturing images on each side, in other embodiments several more may be provided to capture images from various vantage points.

In some examples, the processing of the image(s) to obtain the portion(s) to present in area 422 may include enhancing the portions and/or building skews into them by extrapolation or other techniques. If the acquired image data includes images taken from cameras viewing a scene from multiple angles, it may be possible to extrapolate the data into images of views from other angles, for instance an angle that more closely matches the viewing angle of the second user. In a less complex embodiment, a camera obtains images from a viewing angle that very closely matches the viewing angle of the user and an image portion from an image of that that camera replaces the digital object.

Computer system 414 is show in communication with multi-display system 401. Additionally or alternatively, computer system 414 may be a component of system 401, or may be packaged or provided with multi-display system 401. If, for efficiency or other reasons, it is desirable for one or more backend computer systems 418 to perform processing, such as complex image processing to stitch, isolate, skew, extrapolate, etc. image portions from the collected images, then computer system 414 can enlist the help of the backend for these activities. This may be done in real-time or near-real time so that the image portions presented to the second user present an essentially real-time feed of the scene on the other side of the display. When backend processing is utilized, computer system 414 can provide the necessary data to computer system(s) 418 for those systems to perform processing and return results that computer system 414 uses to achieve aspects described herein, such as presenting portions of image(s) in display area(s), of a second display, through which an impression of a digital object on a first display is viewable. Additionally or alternatively, backend computer system(s) 418 may serve as remote/cloud servers (for instance for a service provider, such as a bank with several branches) that set policies to be followed by site computer systems(s) 414 for the types of digital objects for which impressions are to be blocked from view by others.

The following presents some example implementation steps in accordance with a specific embodiment of aspects described herein. Initially, two transparent displays are overlaid with each other to create at least two layers. The two transparent displays constitute individual display layers. Multiple cameras are installed in, at, around, etc. each of these two layers. The cameras capture the surrounding scenes. When a digital object is displayed in a first layer, software will identify the area/position where the digital object is plotted. Based on image(s) captured by the cameras, software will identify which portions of a scene in the captured image(s) are being obstructed by the digital objects in the first layer from view from the other side (the side that the second layer faces). The appropriate sections of the images will be identified and software will plot the image sections in the second layer. This will not only at least partially cover/mask the impression of the digital object otherwise viewable from the second side, but will at the same time simulate transparency of the layers as viewed from the second side.

As noted above, policies/permissions can be associated with digital objects and/or types or classes of digital objects. The permissions can identify the individuals or types of individuals who can view the digital object and/or impressions of the digital object. Additionally or alternatively, permissions may indicate whether a digital object may be 'passed' from one display to another display. Passing an object from one display to another can facilitate interactivity between users of a multi-display system and improve a customer experience. For instance, if an electronic form being filled-out by a bank teller on a first at least partially transparent display of a multi-display system requires the customer, who is viewing a second at least partially transparent display opposite the first display, to enter a password, it may be desired that the bank teller transfer the electronic form from the first display to the second display, to enable the user to enter the user's password. Meanwhile, it may be desired that a customer information record displayed on the first display not be transferrable to the second display. These aspects can be controlled via permissions on the digital objects. Optionally in the example above where the user enters the user's password, the impression of the soft keyboard used to input the password may be masked from view by the bank teller on the opposite side, in accordance with aspects described herein.

A user may therefore be able to transfer a digital object from one layer to other layer of the display. This may be triggered with a gesture, such as a finger or pressure gesture as examples. If a user desired to transfer a digital object from one layer to another layer, the user triggers software to check a permission associated with the object, for instance a permission for the other user to view the object. If the permission indicates no privilege or fails to indicate a privilege in the affirmative for the other user view/interact with the object, then the transfer can be aborted. Otherwise, the transfer can proceed.

Figure 5:
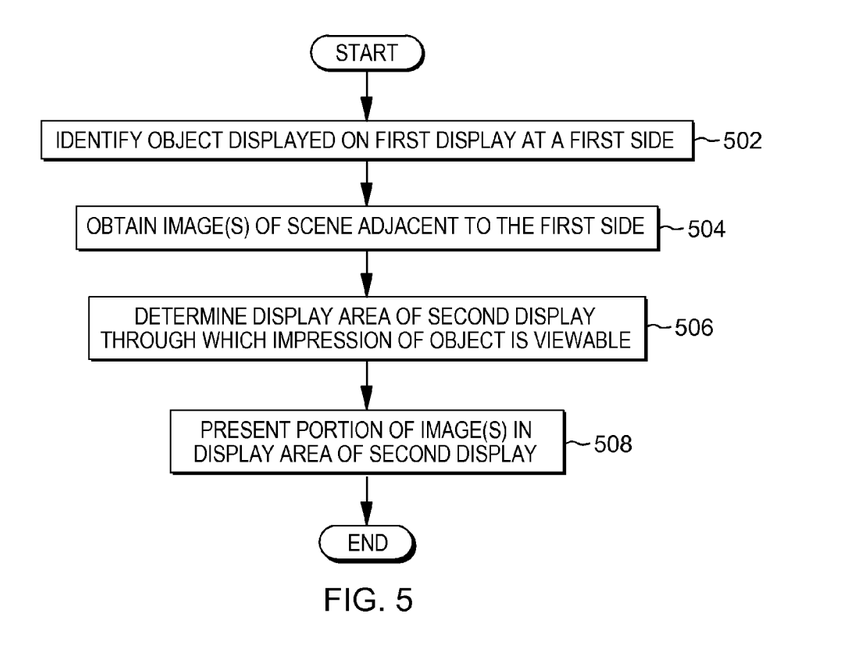
FIG. 5 depicts an example process for managing digital object viewability for a multi-display system, in accordance with aspects described herein.
Figure 6:
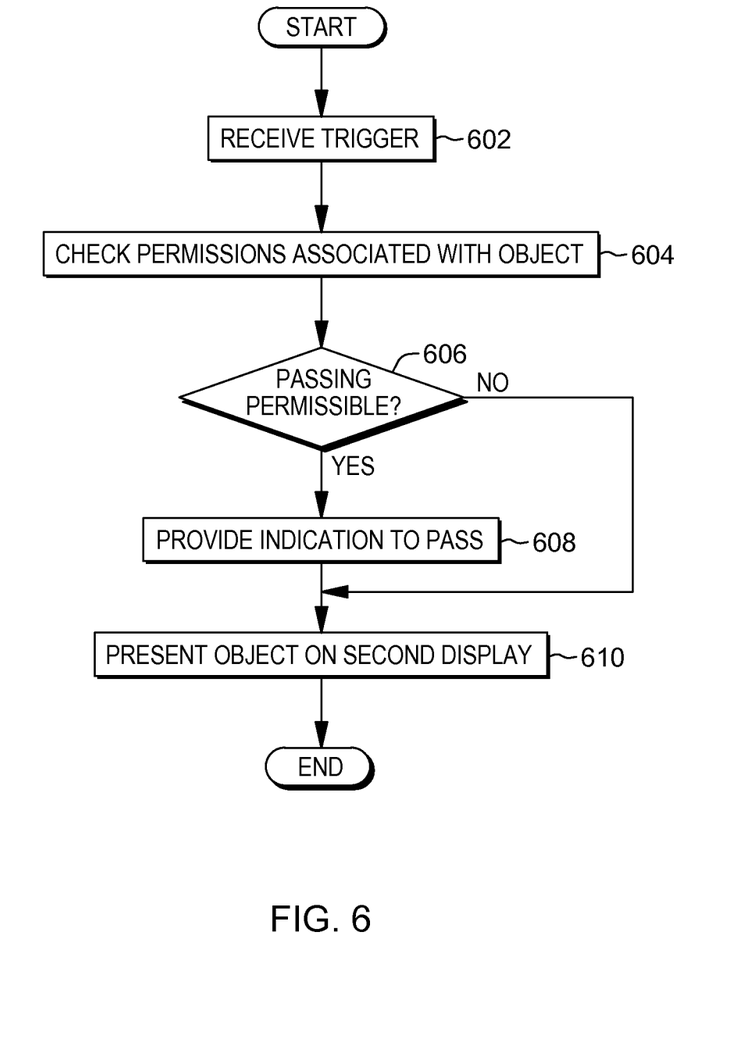
FIG. 6 depicts an example process for passing an object between displays of a multi-display system, in accordance with aspects described herein.

Accordingly, FIGS. 5 & 6 depict example processes in accordance with aspects described herein. FIG. 5 depicts an example process for handling presentation of an object on a multi-display system, such as managing viewability of the object for the system, in accordance with aspects described herein. The process begins by identifying (502) an object displayed on a first display at a first side of the multi-display system. The multi-display system is at least partially transparent between the first display and a second display at a second side of the multi-display system. In some examples, the first display and the second display face substantially opposite directions.

The process also obtains (504) image(s) of a scene adjacent to the first side of the multi-display system. An example includes a live video feed taken of the scene adjacent to the first side of the multi-display system. In some examples, obtaining the image(s) of the scene includes obtaining the image(s) from camera(s) mounted at the first side of the multi-display system and facing outwardly from the multi-display system. Additionally or alternatively, one (or more) camera may be a behind-the-screen camera residing behind the first display.

The method continues by determining (506) a display area, of the second display, through which an impression of the object is viewable from the second side of the multi-display system. Viewability from the second side is possible based on the multi-display system being at least partially transparent between the first display and the second display. Determining the display area through which the impression of the object is viewable includes, in some embodiments, identifying display coordinates of the object displayed on the first display, and identifying the display area of the second display as being opposite an area of the first display corresponding to the display coordinates of the object displayed on the first display.

The method of FIG. 5 then presents (508), in the display area of the second display, at least a portion of the image(s) of the scene adjacent to the first side of the multi-display system. This presentation of the portion(s) of the image(s) can partially or fully mask the impression of the object and mimic transparency of the second display in the display area of the second display. As an optional enhancement, a viewing angle of a user to the impression of the object is taken into account. For instance, a viewing angle of a user proximate the second side of the multi-display system is determined, and the image(s) (from which the image portion(s) being presented are drawn) are selected from a plurality of images, on the basis that those image(s) (from which the portion(s) being presented are drawn) are captured from a viewing angle most closely matching the viewing angle of the user.

In some embodiments, the identifying identifies the object among one or more other objects being displayed on the first display. In that case, viewability of other object(s) or their corresponding impressions from the second side of the display may not be an issue, in which case the impressions can remain viewable from the second side of the multi-display system contemporaneous with the presenting the portion(s) of the image(s) in the display area of the second display.

In accordance with further aspects described herein, an object may be passed between displays of a multi-display system. FIG. 6 depicts an example such process. The process begins with receiving (602) a trigger and consequently triggering the checking (604) of permissions associated with an object (the object may or may not be one for which its impression was masked as described above). In some embodiments, the first display includes a touchscreen display and triggering the checking is based on detecting pressure against the touchscreen display in an area of the touchscreen display where the object to be passed is displayed. This enables a user to use a gesture, physical pressure, or any other recognizable input, to trigger a passing of an object to another display.

After checking the permissions associated with the object, it is determined (606) whether passing of the object to the second display is permissible. If not, then the process ends, perhaps with providing of a failing indication or other indication. However, if passing of the object to the display is permissible, then an indication is provided (608), the indication indicating that the object is to be passed. Based on this indication, the object is passed from the first display to the second display and presented (610) on the second display. Passing in this context could include moving the object to the second display (removing it from the first display) or copying the object to the second display, as examples.

Processes described herein may be performed singly or collectively by one or more computer systems, such as computer system(s) 414 and/or 418, as examples. In some examples, such a computer system that performs process(es) described herein is a computer system that is part of, includes, or uses a multi-display system. In other examples, a remote computer system in communication with such computer system performs process(es) described herein. As a third possibility, a combination of the (i) computer system including/using the multi-display device and (ii) remote computing system(s) perform process(es) described herein.

Figure 7:
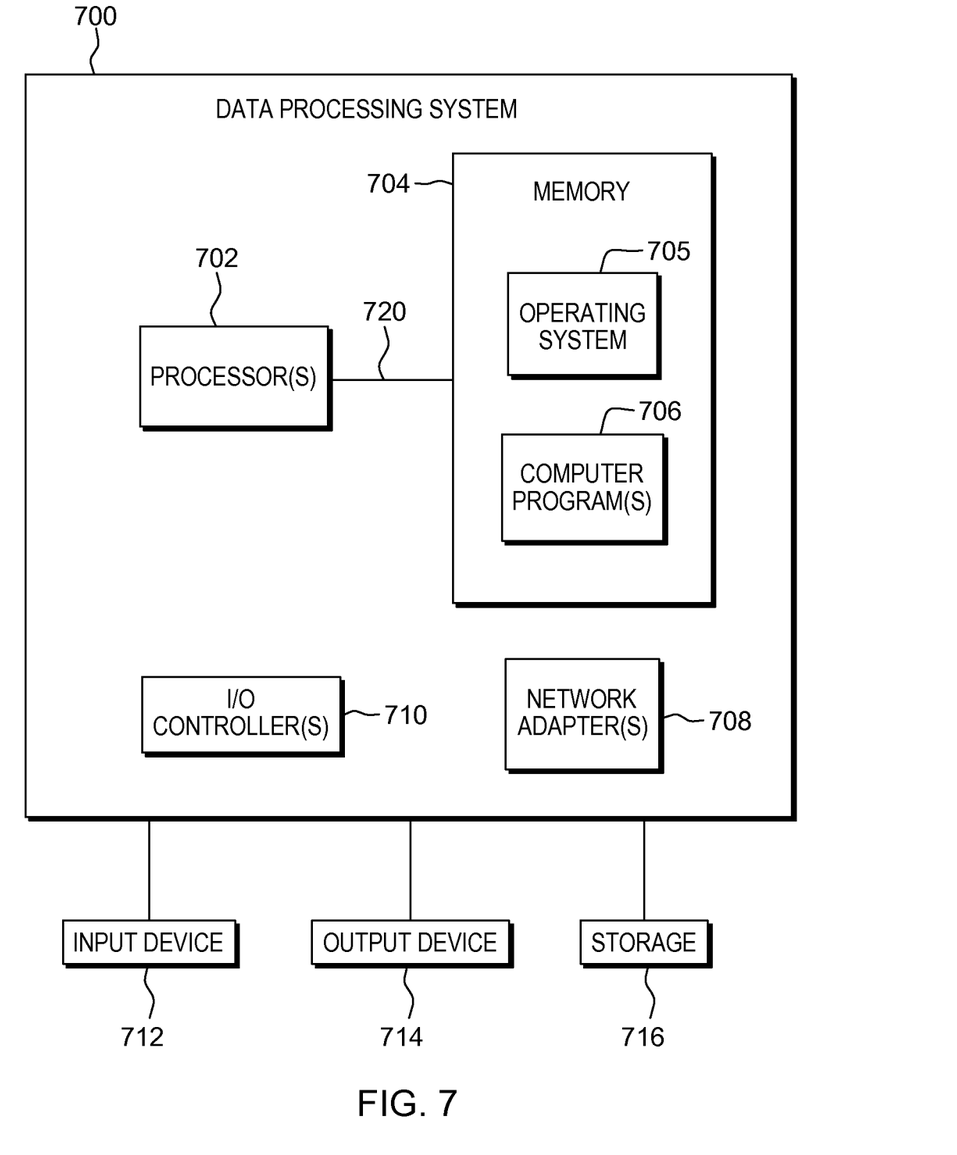
FIG. 7 depicts an example of a computer system to incorporate and use aspects described herein.

FIG. 7 depicts one example of a computer system to incorporate and use aspects described herein. A computer system may also be referred to herein as a processing device/system or computing device/system, or simply a computer. Computer system 700 may be based on one or more of various system architectures such as those offered by International Business Machines Corporation (Armonk, N.Y., USA) or Intel Corporation (Santa Clara, Calif., USA), as examples.

Computer system 700 is suitable for storing and/or executing program code and includes at least one processor 702 coupled directly or indirectly to memory 704 through, e.g., a system bus 720. In operation, processor(s) 702 obtain from memory 704 one or more instructions for execution by the processors. Memory 704 may include local memory employed during actual execution of the program code, bulk storage, and cache memories which provide temporary storage of at least some program code in order to reduce the number of times code must be retrieved from bulk storage during program code execution. A non-limiting list of examples of memory 704 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 704 includes an operating system 705 and one or more computer programs 706, for instance programs to perform aspects described herein.

Input/Output (I/O) devices 712, 714 (including but not limited to displays, microphones, speakers, accelerometers, gyroscopes, magnetometers, light sensors, proximity sensors, GPS devices, cameras, etc.) may be coupled to the system either directly or through I/O controllers 710.

Network adapters 708 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 708 used in computer system.

Computer system 700 may be coupled to storage 716 (e.g., a non-volatile storage area, such as magnetic disk drives, optical disk drives, a tape drive, etc.), having one or more databases. Storage 716 may include an internal storage device or an attached or network accessible storage. Computer programs in storage 716 may be loaded into memory 704 and executed by a processor 702 in a manner known in the art.

The computer system 700 may include fewer components than illustrated, additional components not illustrated herein, or some combination of the components illustrated and additional components. Computer system 700 may include any computing device known in the art, such as a mainframe, server, personal computer, workstation, laptop, handheld or mobile computer, tablet, wearable device, telephony device, network appliance, virtualization device, storage controller, etc.

Figure 8:
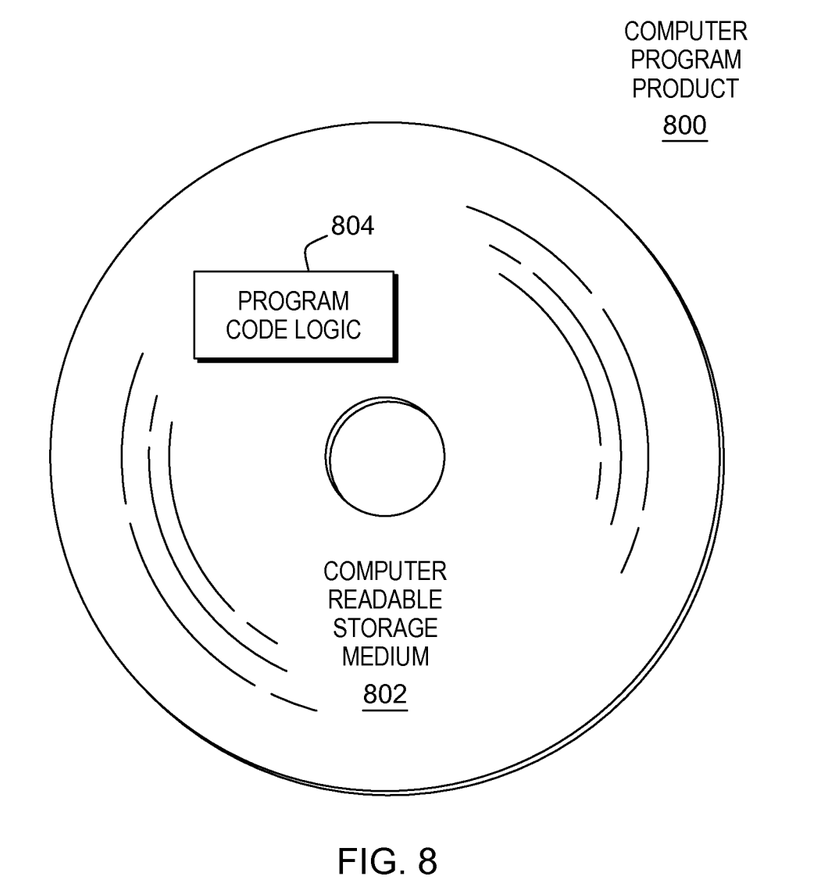
FIG. 8 depicts one embodiment of a computer program product.

Referring to FIG. 8, in one example, a computer program product 800 includes, for instance, one or more computer readable storage media 802 to store computer readable program code means, logic and/or instructions 804 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
identifying an object displayed on a first display at a first side of a multi-display system, the multi-display system being at least partially transparent between the first display and a second display at a second side of the multi-display system;
obtaining one or more images of a scene adjacent to the first side of the multi-display system;
determining a display area, of the second display, through which an impression of the object is viewable from the second side of the multi-display system based on the multi-display system being at least partially transparent between the first display and the second display; and
presenting, in the display area of the second display, at least a portion of the one or more images of the scene adjacent to the first side of the multi-display system to at least partially mask the impression of the object and mimic transparency of the second display in the display area of the second display.

2. The method of claim 1, wherein the one or more images comprise a live video feed taken of the scene adjacent to the first side of the multi-display system.

3. The method of claim 1, wherein the determining the display area comprises:
identifying display coordinates of the object displayed on the first display; and
identifying the display area of the second display as being opposite an area of the first display corresponding to the display coordinates of the object displayed on the first display.

4. The method of claim 1, wherein the first display and second display face substantially opposite directions.

5. The method of claim 1, further comprising passing another object from the first display to the second display to present the another object on the second display, the passing being based on an indication that the another object is to be passed, wherein the passing comprises one of moving the another object to the second display or copying the another object to the second display.

6. The method of claim 5, further comprising:
checking permissions associated with the another object to determine whether passing the another object to the second display is permissible; and
based on determining that passing the another object to the second display is permissible, providing the indication that the another object is to be passed.

7. The method of claim 6, wherein first display comprises a touchscreen display, and wherein the method further comprises triggering the checking based on detecting pressure against the touchscreen display in an area of the touchscreen display where the another object is displayed.

8. The method of claim 1, further comprising:
determining a viewing angle of a user proximate the second side of the multi-display system, the viewing angle being a viewing angle to the impression of the object; and
selecting the one or more images from a plurality of images based on the one or more images being captured from a viewing angle most closely matching the viewing angle of the user.

9. The method of claim 1, wherein the obtaining the one or more images of the scene comprises obtaining the one or more images from one or more cameras mounted at the first side of the multi-display system and facing outwardly from the multi-display system.

10. The method of claim 9, wherein at least one camera of the one or more cameras comprises a behind-the-screen camera residing behind the first display.

11. The method of claim 1, wherein the identifying identifies the object from a plurality of objects displayed on the first display, and wherein an impression of another object of the plurality of objects remains viewable from the second side of the multi-display system contemporaneous with the presenting at least a portion of the one or more images.

12. A computer system comprising:
a memory; and
a processor in communications with the memory, wherein the computer system is configured to perform a method, the method comprising:
identifying an object displayed on a first display at a first side of a multi-display system, the multi-display system being at least partially transparent between the first display and a second display at a second side of the multi-display system;
obtaining one or more images of a scene adjacent to the first side of the multi-display system;
determining a display area, of the second display, through which an impression of the object is viewable from the second side of the multi-display system based on the multi-display system being at least partially transparent between the first display and the second display; and
presenting, in the display area of the second display, at least a portion of the one or more images of the scene adjacent to the first side of the multi-display system to at least partially mask the impression of the object and mimic transparency of the second display in the display area of the second display.

13. The computer system of claim 12, wherein the first display and the second display face substantially opposite directions.

14. The computer system of claim 12, wherein the method further comprises:
checking permissions associated with another object displayed on the first object to determine whether passing the another object from the first display to the second display is permissible to present the another object on the second display;
based on determining that passing the another object to the second display is permissible, providing an indication that the another object is to be passed; and
passing the another object from the first display to the second display based on the indication that the another object is to be passed, wherein the passing comprises one of moving the another object to the second display or copying the another object to the second display.

15. The computer system of claim 12, wherein the method further comprises:
determining a viewing angle of a user proximate the second side of the multi-display system, the viewing angle being a viewing angle to the impression of the object; and
selecting the one or more images from a plurality of images based on the one or more images being captured from a viewing angle most closely matching the viewing angle of the user.

16. The computer system of claim 12, wherein the identifying identifies the object from a plurality of objects displayed on the first display, and wherein an impression of another object of the plurality of objects remains viewable from the second side of the multi-display system contemporaneous with the presenting at least a portion of the one or more images.

17. A computer program product comprising:
a computer readable storage medium readable by a processor and storing instructions for execution by the processor for performing a method comprising:
identifying an object displayed on a first display at a first side of a multi-display system, the multi-display system being at least partially transparent between the first display and a second display at a second side of the multi-display system;
obtaining one or more images of a scene adjacent to the first side of the multi-display system;
determining a display area, of the second display, through which an impression of the object is viewable from the second side of the multi-display system based on the multi-display system being at least partially transparent between the first display and the second display; and
presenting, in the display area of the second display, at least a portion of the one or more images of the scene adjacent to the first side of the multi-display system to at least partially mask the impression of the object and mimic transparency of the second display in the display area of the second display.

18. The computer program product of claim 17, wherein the method further comprises:
checking permissions associated with another object displayed on the first object to determine whether passing the another object from the first display to the second display is permissible to present the another object on the second display;
based on determining that passing the another object to the second display is permissible, providing an indication that the another object is to be passed; and
passing the another object from the first display to the second display based on the indication that the another object is to be passed, wherein the passing comprises one of moving the another object to the second display or copying the another object to the second display.

19. The computer program product of claim 17, wherein the method further comprises:
determining a viewing angle of a user proximate the second side of the multi-display system, the viewing angle being a viewing angle to the impression of the object; and
selecting the one or more images from a plurality of images based on the one or more images being captured from a viewing angle most closely matching the viewing angle of the user.

20. The computer program product of claim 17, wherein the identifying identifies the object from a plurality of objects displayed on the first display, and wherein an impression of another object of the plurality of objects remains viewable from the second side of the multi-display system contemporaneous with the presenting at least a portion of the one or more images.

* * * * *